W. W. SABIN.
LOCKING DEVICE FOR MOTOR VEHICLES.
APPLICATION FILED OCT. 18, 1916.
1,215,871.
Patented Feb. 13, 1917.
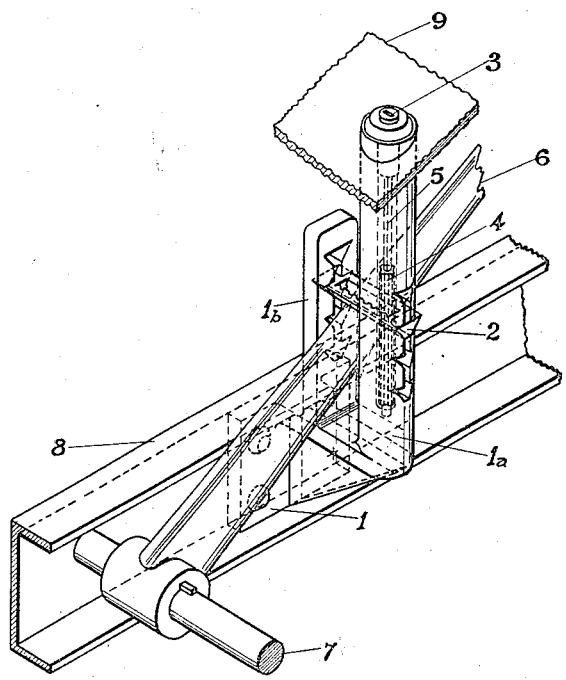
WITNESSES:
G. E. Hanmaker
M. Thayer
INVENTOR
William W Sabin

UNITED STATES PATENT OFFICE.

WILLIAM W. SABIN, OF PORTLAND, OREGON, ASSIGNOR TO NORRIS B. GREGG AND
J. C. HARRALSON, BOTH OF PORTLAND, OREGON.

LOCKING DEVICE FOR MOTOR-VEHICLES.

1,215,871. Specification of Letters Patent. Patented Feb. 13, 1917.

Application filed October 18, 1916. Serial No. 126,357.

*To all whom it may concern:*

Be it known that I, WILLIAM W. SABIN, a citizen of the United States, residing in Portland, in the county of Multnomah and State of Oregon, have invented certain new and useful Improvements in Locking Devices for Motor-Vehicles, of which the following is a specification.

My invention relates to improvements in locking devices for motor vehicles in which the clutch lever of the motor vehicle is locked in such a position that the clutch cannot be put into its working position.

The objects of my invention are:

1st to provide simple and inexpensive means for preventing the unauthorized operation of a motor vehicle; and, 2nd to provide a device that positively cannot be locked or unlocked except with the proper key.

I attain these objects by the design and arrangement of the several parts of the device, and by the position of the device with relation to the part of the motor vehicle mechanism, to be locked, as shown in the accompanying drawing, in which is shown an isometric view of the device in position, and locked portions of the side frame, clutch arm, clutch shaft, and floor of a motor vehicle being necessarily shown.

The device consists essentially of the frame 1, upward projecting member $1^a$ and the other upward projecting member $1^b$, the bolt 2, means for imparting to bolt 2 a rectilinear motion within the slotted holes hereinafter described in $1^a$ and $1^b$, and a lock for said means. The frame consists of the base 1 for securing the device to the frame of the motor vehicle, a member projecting outwardly from said base, a rib supporting said outwardly projecting member and members $1^a$ and $1^b$ projecting upwardly from the top of the outwardly projecting member. 1, $1^a$ and $1^b$ may be made of several pieces joined in an approved manner, but I prefer to make it in one piece, and a casting. The frame is riveted to the side frame 8 of the motor vehicle at the proper place and position to encompass the clutch arm 6 of the motor vehicle within the space between the bolt 2, the upwardly projecting members $1^a$ and $1^b$, and that part of the outwardly projecting member of frame 1 directly under the bolt. In $1^a$ and $1^b$ are oppositely arranged transverse holes forming guides for the bolt 2. The diameter or transverse width of $1^a$ is such that the bolt 2 is guided by the slot in $1^a$ with sufficient precision to permit it to readily enter the slot in $1^b$. To further insure smooth action the end edges of the bolt and the edges of the slots on the inner face of $1^b$ are slightly chamfered. In order to provide for the slight variation in the position of the clutch arm due to different makes of motor vehicle, several slots are provided, thus giving an adjustability in a vertical direction. Transverse adjustability is readily provided for in the frame 1 by varying the distance of its attaching face from the upwardly projecting members $1^a$ and $1^b$. This is readily accomplished in the pattern, if a casting is used. The upwardly projecting member $1^a$ is of a length to just project through the floor board 9 of the motor vehicle, the casting being long enough to suit the largest type of motor vehicle and cut to length required for any particular motor vehicle. In the center of $1^a$ is an axial hole in which is located the means of imparting the desired rectilinear motion to the bolt 2 as hereinafter described.

The bolt 2 may be of any desired section and material but I prefer to make it of steel, and as shown, with a triangular cross section, and with the apex of the triangle flattened and the bolt located with the flattened apex on the under side. The length of bolt 2 is such that its ends when in its locked position, are flush with the outside faces of $1^a$ and $1^b$, and when in its unlocked position, its inner end is flush with the inside of $1^a$.

In the bolt 2 is a centrally located longitudinal opening through the bolt in a direction to the axis of the upwardly projecting member $1^a$. One of the longitudinal sides of this opening has on it teeth of a proper size and pitch to mesh with the teeth of the pinion hereinafter described. The opening in the bolt is of a width just sufficient to allow clearance for the pinion, and consequently prevents the pinion from getting out of gear. The amount of rectilinear movement of the bolt is determined by the length of the longitudinal opening, the pinion acting as a positive stop in either direction.

For imparting to the bolt 2 the necessary rectilinear motion, a pinion 4, formed on or attached to the lower end of the extension stem of the lock hereinafter described, is provided, the teeth of the pinion meshing with the teeth on the bolt. The length of the pinion is made sufficient to accommodate the bolt in any of its vertical positions. To prevent any lateral motion of the pinion, the bottom end is made cylindrical, and fits pivotally into the bottom of the axial hole.

The lock 3 is of the best type of the ordinary cylinder lock, and is attached to the upper end of 1ª by brazing or other means adequate to prevent its removal.

The device is readily assembled by determining the transverse location of the clutch arm of the motor vehicle to which the device is to be fitted, selecting the frame which will give the proper transverse dimension, inserting the bolt in the proper vertical location, cutting off the member 1ª to suit the floor height, inserting pinion and lock, and then attaching the lock, permanently. The assembled device is then riveted to the frame of the motor vehicle at the proper position as hereinbefore described.

To lock the device, the clutch arm is pressed downward until it touches the horizontal member of the frame 1, throwing out the clutch, the key is inserted in the lock, and the bolt moved into the locked position as shown in the drawing. The clutch arm is then released and allowed to rest against the bolt. To unlock the device, the clutch arm is first pressed down, relieving the tension on the bolt, the key inserted, the bolt moved over to the unlocked position, and the clutch arm is then free to be operated as usual in the running of the motor vehicle. It will be seen, that since the clutch, when the device is locked, is thrown out and held thus, that, while the engine may be run, the motor vehicle absolutely cannot be moved by its propelling machinery.

This invention has the following advantages. It is extremely simple; inexpensive; easy to fit to and attach to any make of motor vehicle; can be locked or unlocked instantly and with ease; is of great strength and durability; and positively prevents, when locked, the running of the motor vehicle without the floor being torn up and the bolt severed.

Changes in the form, proportion, and minor details of construction may be resorted to without departing from the spirit or sacrificing any of the advantages of this invention.

What I claim is:

1. In a locking device for a motor vehicle, a base member adapted to be attached to the frame thereof, said member having an outwardly projecting member, two upwardly projecting members projecting upward from the top of the outwardly projecting member; in said upwardly projecting members three pairs of oppositely arranged transverse holes; a bolt adapted to slide within and through said transverse holes; a lock attached to the upper end of one of the said upwardly projecting members; an extension stem connected to said lock, on said stem, teeth for imparting transverse rectilinear motion to said bolt, said stem being disposed within said upwardly projecting member; said complete device being disposed in such a position as to encompass and hold when in its locking position in the space between the bolt, the outwardly projecting member, and the upwardly projecting members, the clutch lever of the motor vehicle in its non-working position.

2. In a locking device for a motor vehicle a base member adapted to be attached to the frame thereof, said member having an outwardly projecting member carrying two upwardly projecting members projecting upward from the top of the outwardly projecting member; in said upwardly projecting members three pairs of oppositely arranged transverse holes; a bolt adapted to slide within and through the transverse holes, said bolt having a centrally located longitudinal opening having gear teeth on one side; one of said upwardly projecting members having an axial hole; a lock attached to the upper end of said member, a pinion disposed in said axial hole; said pinion adapted to mesh with the gear teeth on the bolt and impart to said bolt transverse rectilinear motion, and an extension stem connecting said lock and pinion, said complete device disposed in such a position as to encompass and hold when in its locked position in the space between the bolt, the outwardly projecting member and the upwardly projecting members, the clutch lever of the motor vehicle in its non-working position.

In testimony whereof, I have hereunto set my hand in the presence of two subscribing witnesses.

WILLIAM W. SABIN.

Witnesses:
G. E. HAMAKER,
M. THAYER.